United States Patent
Fung et al.

(10) Patent No.: US 10,459,745 B2
(45) Date of Patent: *Oct. 29, 2019

(54) APPLICATION HELP FUNCTIONALITY INCLUDING SUGGESTED SEARCH

(71) Applicant: Business Objects Software Limited, Dublin (IE)

(72) Inventors: Alfred Fung, Burnaby (CA); Sean McGregor, Vancouver (CA); Brian McConville, Vancouver (CA); Xing Jin, Vancouver (CA); Trevor Dubinsky, Surrey (CA); Philip Leung, Richmond (CA); Ariel Kahana, North Vancouver (CA); Stephen Paxian, New Westminster (IE)

(73) Assignee: Business Objects Software LTD, Dublin (IE)

( * ) Notice: Subject to any disclaimer, the term of this patent is extended or adjusted under 35 U.S.C. 154(b) by 125 days.

This patent is subject to a terminal disclaimer.

(21) Appl. No.: 14/971,508

(22) Filed: Dec. 16, 2015

(65) Prior Publication Data
US 2017/0177386 A1 Jun. 22, 2017

(51) Int. Cl.
*G06F 9/451* (2018.01)
*G06F 16/33* (2019.01)
(Continued)

(52) U.S. Cl.
CPC ........... *G06F 9/453* (2018.02); *G06F 3/0482* (2013.01); *G06F 16/3322* (2019.01); *G06F 16/3329* (2019.01)

(58) Field of Classification Search
CPC .. G06F 9/4446; G06F 3/0481; G06F 3/04842; G06F 3/14; G06F 17/30164;
(Continued)

(56) References Cited

U.S. PATENT DOCUMENTS 9,213,748 B1 * 12/2015 Matias .............. G06F 17/30864
9,589,253 B2 * 3/2017 Eby ...................... G06Q 10/103
(Continued)

OTHER PUBLICATIONS

Google—"People Also Ask Search Box", by Barry Schwartz, Apr. 17, 2015.*

*Primary Examiner* — Mahelet Shiberou
(74) *Attorney, Agent, or Firm* — Fountainhead Law Group P.C.

(57) ABSTRACT

Software program "help" functionality includes features enhancing its relevance to users. An engine may receive/record context data arising from interactions between a user and the software program. The engine may process that context data to reference a plurality of sources (e.g., official help documentation, user blogs, partner web sites, etc.) and harvest relevant help information. Based upon stored context data and help information available from the plurality of sources, certain embodiments may generate suggested questions allowing further exploration of help issues. Some embodiments may offer help information in the form of an interactive "hotspot" focusing upon a specific UI element (e.g., icon). Processing the context data may allow the engine to assign a particular skill level (e.g., novice/intermediate/expert) to individual users, tailoring the help information to that skill level. The interactive nature of the help functionality may enhance its use in conjunction with complex workflows encountered in many software programs.

12 Claims, 9 Drawing Sheets

(51) Int. Cl.
*G06F 3/048* (2013.01)
*G06F 3/0482* (2013.01)
*G06F 16/332* (2019.01)

(58) Field of Classification Search
CPC ...... G06F 3/048; G06F 9/453; G06F 16/3322; G06F 16/3329; G06F 3/0482
See application file for complete search history.

(56) References Cited

U.S. PATENT DOCUMENTS

| | | | |
|---|---|---|---|
| 9,679,027 B1* | 6/2017 | Matias | G06F 17/30554 |
| 9,804,736 B2* | 10/2017 | Sutardja | G06F 3/0481 |
| 2002/0015056 A1* | 2/2002 | Weinlaender | G06F 9/4446 |
| | | | 715/705 |
| 2005/0268234 A1* | 12/2005 | Rossi, Jr. | G06F 9/4446 |
| | | | 715/705 |
| 2006/0064472 A1* | 3/2006 | Mirho | H04W 28/18 |
| | | | 709/220 |
| 2011/0004608 A1* | 1/2011 | Solaro | G06F 17/30864 |
| | | | 707/759 |
| 2012/0259845 A1* | 10/2012 | Matejka | G09B 7/02 |
| | | | 707/723 |
| 2013/0314302 A1* | 11/2013 | Jeung | G06F 3/1454 |
| | | | 345/2.3 |
| 2014/0280230 A1* | 9/2014 | Masato | G06F 17/30041 |
| | | | 707/749 |
| 2014/0281890 A1* | 9/2014 | D'Angelo | G06F 17/30598 |
| | | | 715/234 |
| 2015/0186153 A1* | 7/2015 | Voronkov | G06F 9/4446 |
| | | | 715/708 |
| 2015/0242504 A1* | 8/2015 | Profitt | G06F 3/04842 |
| | | | 707/767 |
| 2015/0339348 A1* | 11/2015 | Joo | G06F 17/3005 |
| | | | 707/722 |

* cited by examiner

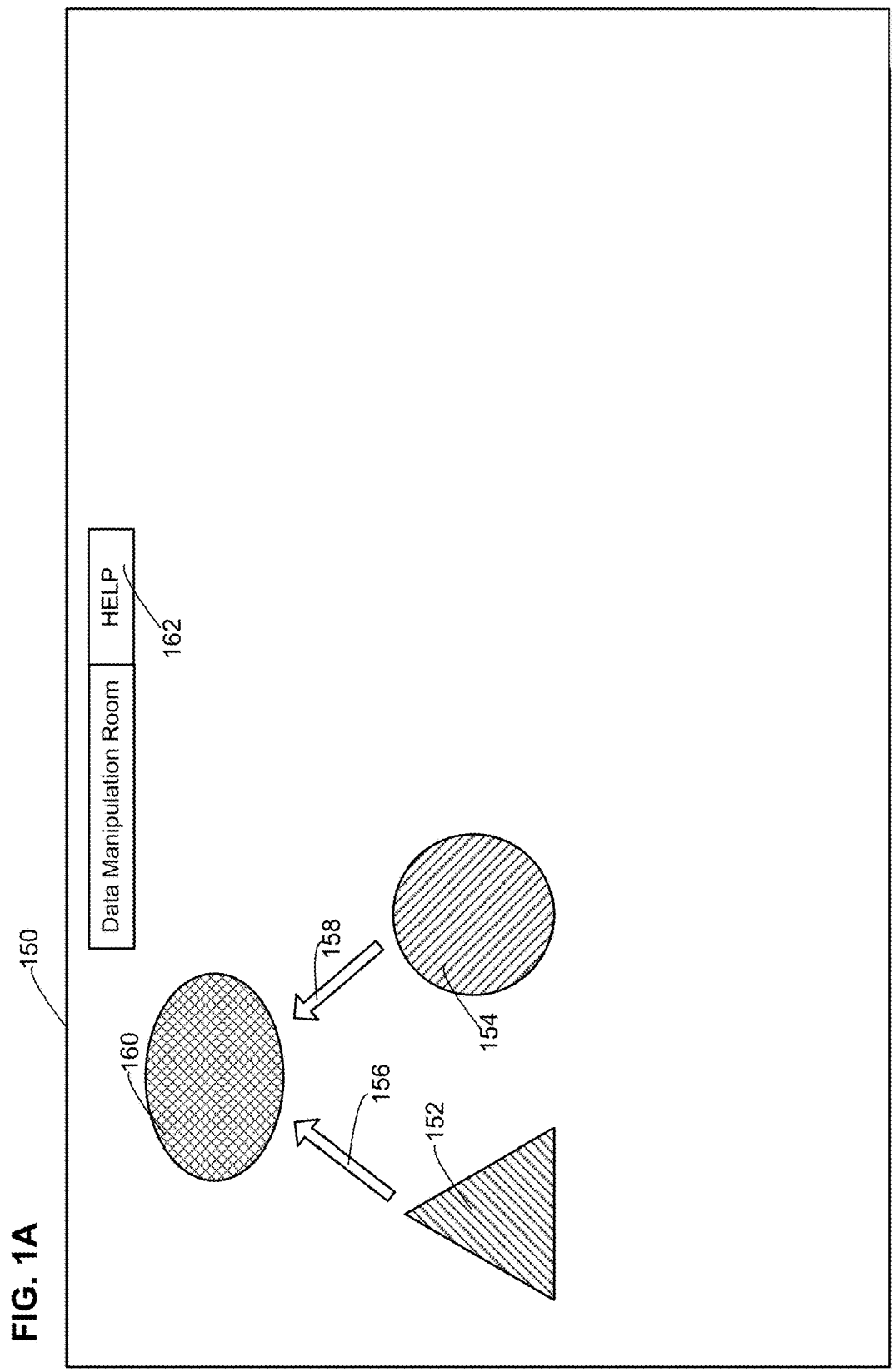

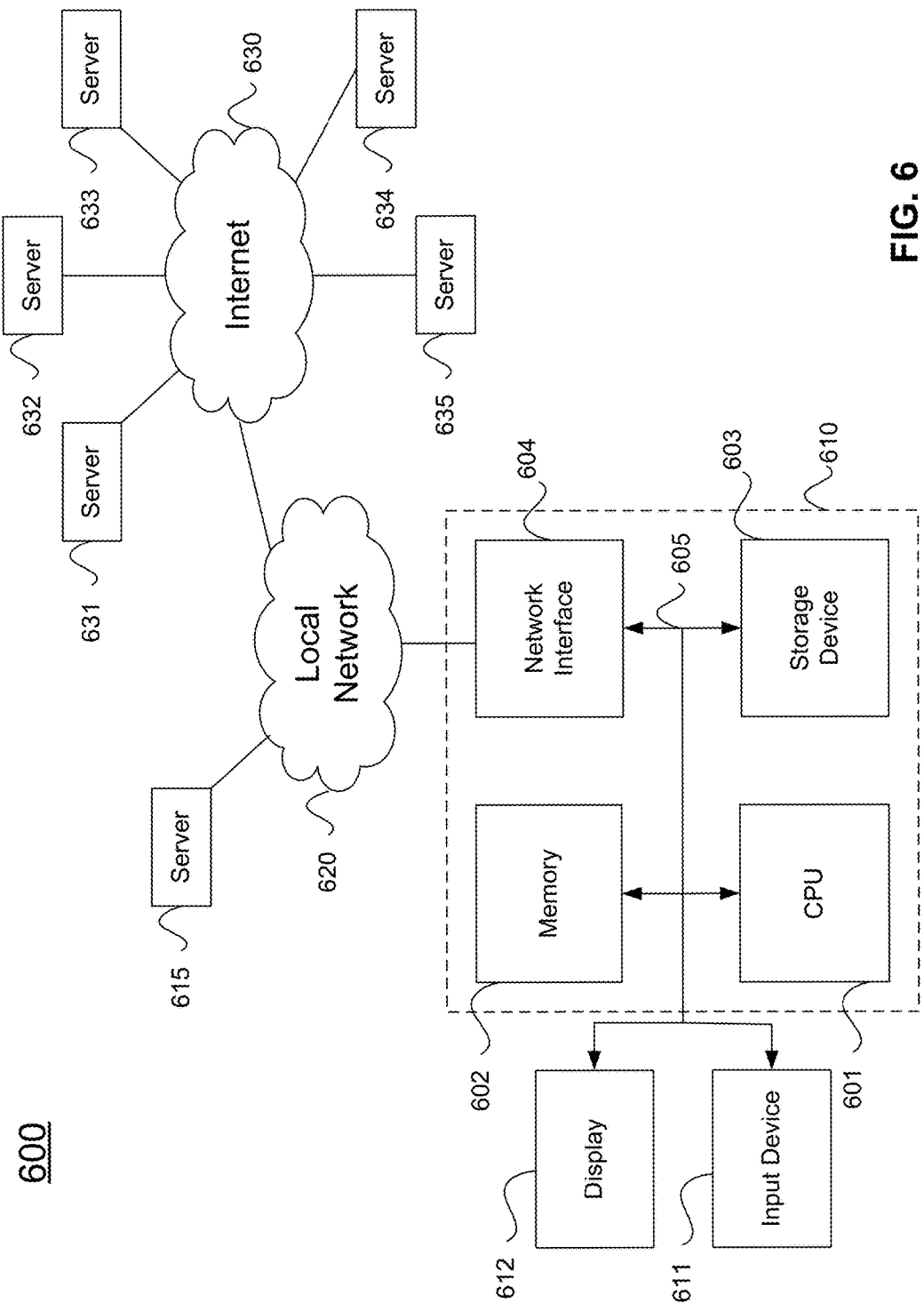

APPLICATION HELP FUNCTIONALITY INCLUDING SUGGESTED SEARCH

BACKGROUND

Unless otherwise indicated herein, the approaches described in this section are not prior art to the claims in this application and are not admitted to be prior art by inclusion in this section.

Embodiments relate to user interfaces, and in particular, to methods and apparatuses presenting an interactive hotspot that highlights particular elements of a user interface (UI).

Specifically, conventional help systems for software products are typically presented as reference material, such as excerpts from a larger user manual. Such approaches to providing software help can be relied upon to learn about the basic functionality of a product. However, they do not lend themselves to guiding users through more complex activities such as problem solving or learning/manipulating workflows. As used herein, the term workflow refers to sets of actions that are designed to allow a user accomplish a particular result.

Instead, conventional software help programs are typically static, offering relatively little user interaction. Moreover, conventional help systems may readily become outdated as software versions change.

As software versions update, the UI elements may change, disrupting the user's experience. And, new UI elements introduced during software iterations are not easily discoverable by users.

One common method relied upon by users to learn about new software, is through trial and error. However, upon encountering unfamiliar (e.g., new) UI elements, software users may be unsure how to combine and utilize features within the software in order to accomplish their desired goals.

Conventionally, the software may offer only basic tips providing the name of the UI element, rather than helping to answer important questions as to why/how to use it. Further access to more detailed information regarding a UI element, may require the user to leave their place in the software application in order to move to a different document or program. This takes users away from their experience within the software: they are reluctant to be interrupted in this manner and are thus reluctant to utilize conventional help offerings.

SUMMARY

Embodiments provide software program "help" functionality, that includes one or more features enhancing its relevance to users. An intervening engine may receive and record context data arising from interactions between a user and the software program. The engine may process that context data to reference a plurality of sources (e.g., official help documentation, informal user blogs, third party partner web sites, etc.) and harvest relevant help information therefrom. Based upon stored context data and help information available from the plurality of sources, certain embodiments may generate suggested questions allowing further exploration of relevant help information. Some embodiments may offer help information in the form of an interactive "hotspot" focusing upon a specific UI element (e.g., icon). Processing the context data may allow the engine to assign a particular skill level (e.g., novice/intermediate/expert) to individual users, tailoring the help information to that skill level. The interactive nature of the help functionality may enhance its use in conjunction with complex workflows encountered in many software programs.

An embodiment of a computer-implemented method comprises an engine receiving a first interaction between a user and a software application, and the engine processing the first interaction according to context data to formulate a query. The engine expresses the query as a suggested question in panel embedded in an interface, and the engine poses the query to a plurality of data sources in response to the user selecting the suggested question. The engine collects help information from one of the plurality of data sources in response to the query, stores the help information, and displays the help information in the panel.

A non-transitory computer readable storage medium embodies a computer program for performing a method comprising, an engine receiving a first interaction between a user and a software application, and the engine processing the first interaction according to context data to formulate a query. The engine expresses the query as a suggested question in panel embedded in an interface, poses the query to a plurality of data sources in response to the user selecting the suggested question, and collects help information from one of the plurality of data sources in response to the query. The engine stores the help information and the additional help information, and displays the help information and the additional help information in the panel.

An embodiment of a computer system comprises one or more processors and a software program executable on said computer system and configured to cause an in-memory database engine to receive a first interaction between a user and a software application. The software program is further configured to cause the in memory database engine to process the first interaction according to context data from an in-memory database to formulate a query, and to express the query as a suggested question in panel embedded in an interface. The software program is further configured to cause the in memory database engine to pose the query to a plurality of data sources in response to the user selecting the suggested question, and to collect help information from one of the plurality of data sources in response to the query. The software program is further configured to cause the in memory database engine to store the help information in the in-memory database, and to display the help information in the panel.

Some embodiments further comprise the engine collecting additional help information from another of the plurality of data sources in response to the query, storing the additional help information, and displaying the additional help information in the panel.

Certain embodiments further comprise the engine weighting the help information and the additional help information, and displaying the help information ranked according to the weighting.

In specific embodiments the weighting is based upon data source provenance.

In specific embodiments the first interaction occurs through a device.

In various embodiments the panel is displayed on a different device.

According to certain embodiments the first user interaction comprises a step in a workflow and the context information identifies the workflow.

In specific embodiments the workflow is defined by the software application.

In particular embodiments the engine generates a keyword of the query based upon the context data.

In particular embodiments the context data and the help information are stored in Random Access Memory (RAM) of an in-memory database, and the engine comprises an in-memory database engine.

The following detailed description and accompanying drawings provide a better understanding of the nature and advantages of embodiments.

BRIEF DESCRIPTION OF THE DRAWINGS

FIG. 1A shows a simplified user interface screen according to an embodiment.

FIG. 6 illustrates an example computer system.

DETAILED DESCRIPTION

Described herein are methods and apparatuses configured to provide interactive hotspots highlighting specific elements of a user interface. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Software program "help" functionality according to embodiments, includes features enhancing its relevance to users. An engine may receive/record context data arising from interactions between a user and the software program. The engine may process that context data to reference a plurality of sources (e.g., official help documentation, user blogs, third party partner web sites, etc.) and to harvest relevant help information therefrom. Based upon stored context data and help information available from the plurality of sources, certain embodiments may generate suggested questions allowing further exploration of help topics by a user. Some embodiments may offer help information in the form of an interactive "hotspot" focusing upon a specific UI element (e.g., icon). Processing the context data may allow the engine to assign a particular skill level (e.g., novice, intermediate, expert) to individual users, tailoring the help information provided according to that skill level. The interactive nature of the help functionality may enhance its use in conjunction with complex workflows encountered in many software programs.

Figure 1:
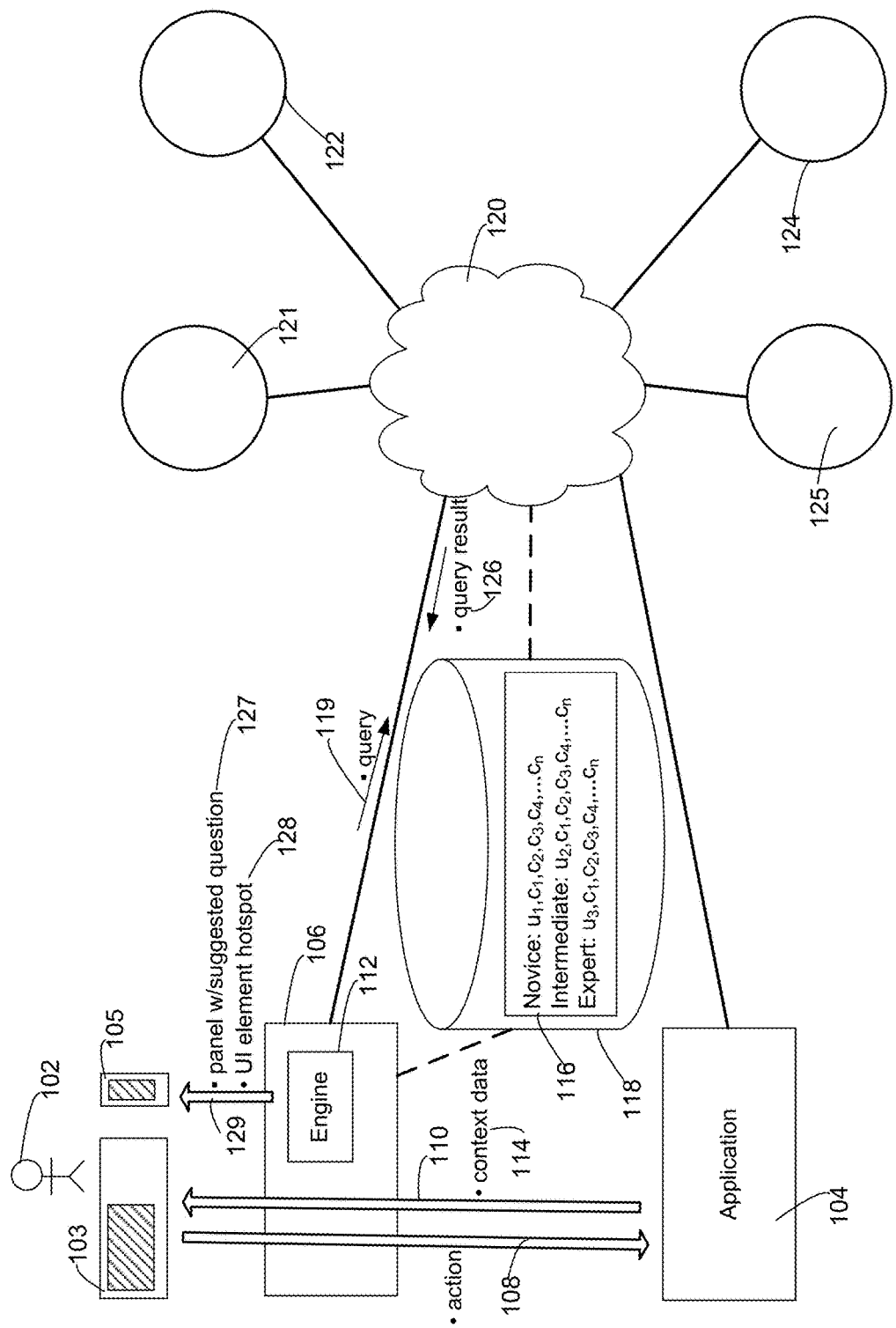
FIG. 1 shows a simplified block diagram of a system according to an embodiment.

FIG. 1 presents a simplified view of a system 100 according to an embodiment. In particular, user 102 is in communication with a software program 104 via devices 103, 105 to perform various tasks. Here, 103 indicates to a first user device corresponding to one form factor (e.g., desktop), while 105 indicates a second mobile device corresponding to another form factor (e.g., smartphone, tablet).

That software program can be of almost any type, and can focus, for example, upon various business-related topics such as Enterprise Resource Management (ERM) and Customer Relationship Management (CRM).

Help system 106 is interposed between the user and the software program. Help system 106 is configured to receive user input 108 to the software program, and also to receive corresponding output 110 transmitted back to the user from the software program.

Based upon monitored communications between the user and software program, the engine 112 of the help system is configured to detect context data 114. And, in view of that context data, the engine is configured to access various possible sources in order to gather and present help information relevant to the user's interaction with the software program.

Such sources may be external or internal to the environment in which the application resides. For example, as described below various internal sources of potential valuable help information may exist, such as formal sanctioned help documentation, official user groups, and an IT department. Various external sources may also provide valuable help information, for example third party partners, unofficial user blogs, and general Internet resources.

Figure 1B:
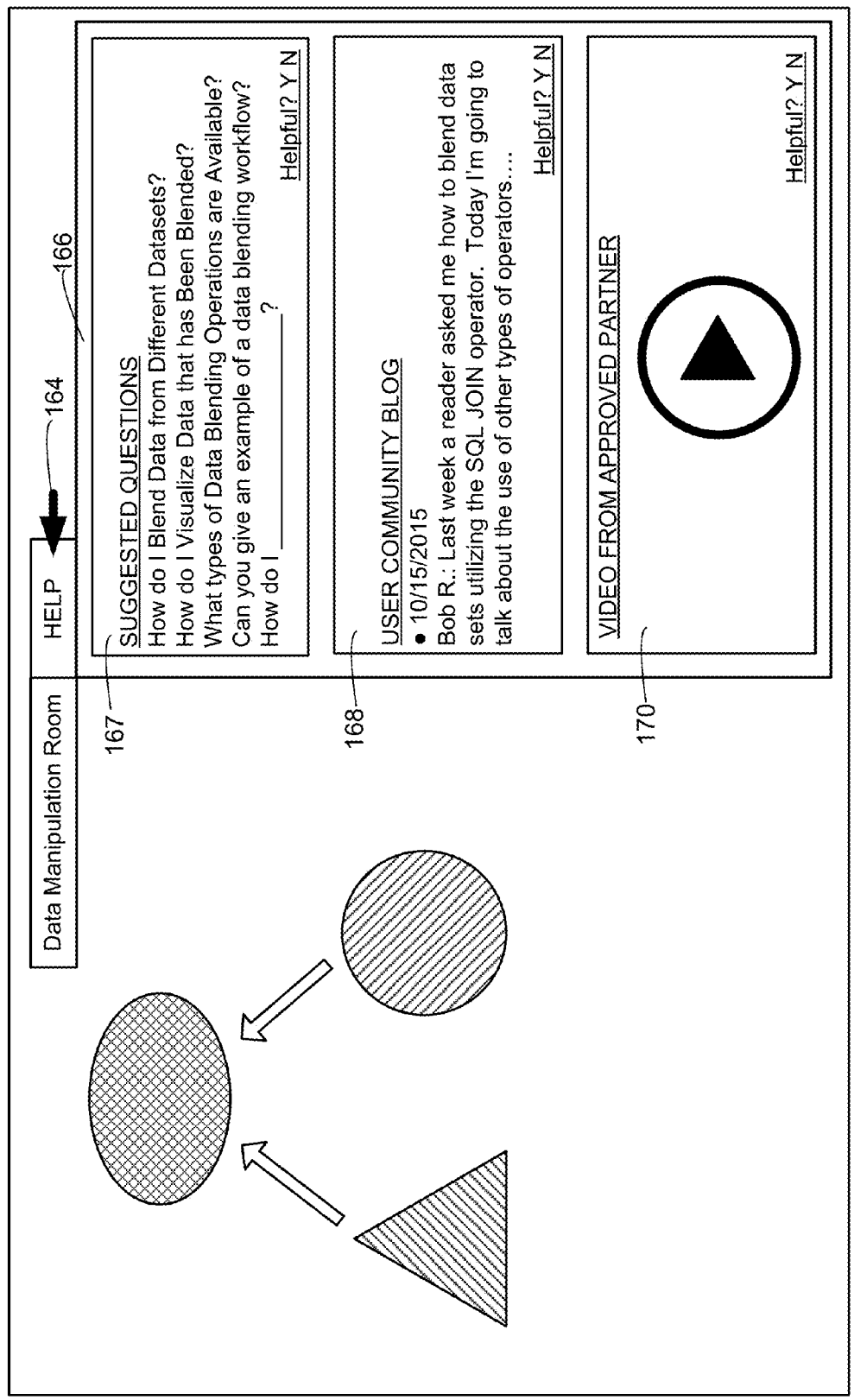
FIG. 1B shows a simplified user interface screen including a suggested search help feature according to an embodiment.
Figure 1C:
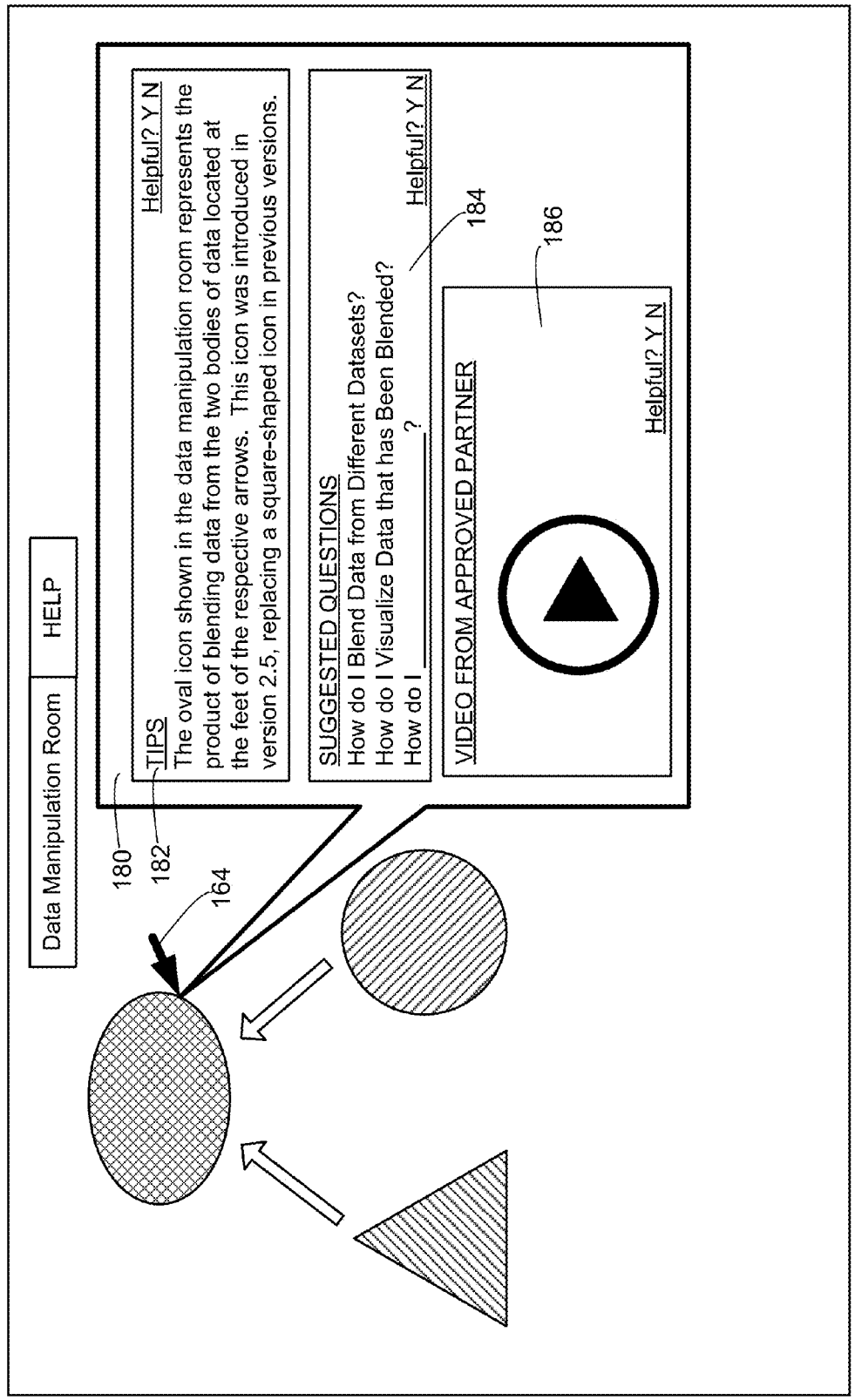
FIG. 1C shows a simplified user interface screen including a UI element hotspot according to an embodiment.

One example is now presented in connection with FIGS. 1A-1C. FIG. 1A illustrates a highly simplified user interface screen 150 showing a data manipulation room of the application.

Screen 150 includes a first icon 152 representing a first body of data accessible to the software program, and a second icon 154 representing a second body of data also accessible to the software program. Arrows 156 and 158 pointing to the third icon 160 of the interface screen of FIG. 1A, indicate that the user seeks to perform an action combining the first body of data with the second body of data.

Returning to FIG. 1, the engine of the help system receives context data indicating the presence of the user in the software program's particular data manipulation room. Various types of context data are described in detail below.

The engine may accordingly store that context data (e.g., $c_1$, $c_2$, $c_3$, etc.) in specific fields of a database 116 located in non-transitory computer readable storage medium 118. In certain embodiments, the database may represent an in-memory database, and the non-transitory computer readable storage medium may comprise Random Access Memory (RAM). That context data may be stored in association with a particular user (e.g., $u_1$, $u_2$, $u_3$, etc.) of the software program.

The engine may further process the context data and user information to determine an experience level. Thus context data may be consistent with a particular user having extensive experience with the software application. One example of context information revealing such a higher experience level could be the user engaging in complex workflow activities such as the creation of workflows involving data blending. Accordingly, such an experience classification could determine the help information delivered and/or the manner of delivering that information.

Alternatively, context data could be consistent with a user having little or no experience with the software application. An example of context information revealing lower levels of experience could be the user engaging in simple tasks such as interacting only with existing workflows (rather than creating them). In that case the help system would be configured to deliver basic types of help information in a simple format so as not to overburden the novice user with too much detailed information.

In certain embodiments, the engine of the help system may reside in an application layer that is in direct communication with the database as part of an underlying database layer. In other embodiments the engine of the help system may be in communication with the database via the network (e.g., cloud).

Based upon processing of the available context data, the engine recognizes that the user is likely seeking to combine two bodies of data in some manner. Accordingly, the engine seeks to reference various possible sources for information relevant to the combination of data.

In particular, the engine may reference the context data to generate key words relevant thereto, useful for harvesting information from various sources. Here, examples of such key words could be "merge", "combine", "blend", "join", etc. Those keywords are incorporated into queries 119 that are issued to sources of help information.

Using such context data and keywords, the engine may access network 120 in order search a first source 121 comprising official help documentation (e.g., a user manual) associated with the software program. The engine may also search a second source 122 comprising the blog of an informal user group of the software program. The engine may also search a third source 123 comprising a website of an official third party partner of the software program.

The engine may also access via the network 120, other sources of information that are not necessarily affiliated with the software program itself. For example, a fourth source 124 may comprise a general external search engine (e.g., GOOGLE). That search engine is configured to search the internet for information relevant to combining data in the particular environment of the software application.

In another example, a source of information 125 comprising an enterprise local community may be accessed. That source could provide help information regarding non-program specific topics such as the configuration of firewall settings, etc.

In response to queries issued by the engine, the various sources may return as query results 126, information relevant to helping a user perform the data combination action in the environment of the software program. That help information may also be stored by the engine in the database.

It is noted that FIG. 1 is simplified for purposes of illustration. For example, while FIG. 1 shows the help system/engine monitoring direct interaction between the user and the application, this is not required. In alternative embodiments interaction between the user and the application could take place over the cloud, with the help system positioned to receive and process such cloud-based actions and context data.

Help information 129 that is collected and stored by the engine, may be presented to the user in a number of ways. One manner of presenting help information is through a panel 127 including suggested questions that is embedded within the software program UI screen. This approach is shown in FIG. 1B.

In particular, the screen 150 of FIG. 1A includes a HELP button 162. FIG. 1B shows cursor 164 manipulated by the user to activate that HELP button.

As a result of this interaction, help panel 166 appears embedded in the UI screen of the application. Panel 166 includes several types of help information available from a variety of sources.

For example, the help panel may include a window 167 including a list of suggested questions relating to the context of the user's interaction with the application. Here, the suggested questions relate to various aspects of data combination. FIG. 1B further shows that the window may also include a blank question for filling in by a user.

The help information and/or the suggested questions of the panel may be offered in a list whose ordering reflects a ranking based upon a weight assigned by the engine. The engine could compute this weight, for example, based upon factors such as:

frequency that the question has been adopted by other users;

closeness of the fit of the question to the key words of the query;

provenance of source of the help information (e.g., in descending order: official help document; obtained from approved $3^{rd}$ party partner, obtained from unofficial user group, raw search result from internet);

user feedback (e.g., clicking "Y" in response to "Helpful?" prompt);

other factors.

The help system may operate in a manner that is dynamic rather than static. Thus as the user continues to interact with the application and provide additional actions, the help information (including the listing of suggested questions) can be updated to reflect the most recent context data.

The help panel embedded in the user interface screen of FIG. 1B may also include information in a plurality of formats. Examples include videos, PDF documents, web pages, and others.

Here, for purposes of illustration the window 168 shows a blog entry from a user group centered around the software. Window 170 shows a video produced by an official third party partner of supplier of the software. The user may interact with panels 168, 170 to obtain help information relevant to his or her specific objectives in interacting with the software program.

One particular variety of help information that may be particularly useful, is a "walkthrough" of a multi-step workflow. Such a walkthrough could take the form of an animation, a video demonstration, or a written flow diagram of actions to be taken in a particular order (e.g., presented as a PDF document or web page).

In particular embodiments, help information in the form of a walkthrough, could be presented utilizing UI element hotspots, as are now discussed below.

Specifically, FIG. 1 shows another manner of presenting help information regarding the software program is through an interactive hotspot 128 associated with a particular element of the UI. This approach is shown in FIG. 1C.

In particular, FIG. 1C shows that by the user moving the cursor 164 over a boundary of icon 160, a panel 180 embedded within the UI window may open. That embedded panel includes help information specific to the particular UI element represented by icon 160.

For example, the window includes tip information 182 explaining the icon and its function. Here, the tip information explains that the icon 160 represents the result of blending data from the two different data sets leading to it with arrows. The tip information reveals that the icon has been changed from a previous version of the software, and may provide other details regarding its appearance and operation.

The hotspot panel embedded in the UI screen may include additional information. For example, window 184 includes suggested questions as described above, and window 186 permits viewing of a video relating to data blending, as may be available from an outside source.

And, as previously mentioned, a UI hotspot may be utilized to present help information in the form of a walkthrough of a workflow process. The UI hotspot could selectively dynamically highlight particular UI elements (e.g., icons, panels, buttons) as they are implicated in the workflow being explained by the walkthrough.

In some cases, the walkthrough could be performed for a user device/form factor different from the one currently interacting with the application. For example, a user accessing the application/help system via a desktop device, could have help information in the form of a walkthrough, delivered instead to a mobile device (e.g., smart phone, tablet). Information regarding the devices/form factors may be stored in a registry together with context data and the user information.

The existence of a hotspot for a particular UI element may provide a mechanism for bi-directional communication involving the help system. That is, FIG. 1C shows a user navigating to a help panel by interacting with the UI element hotspot. However, communication could also take place in the reverse direction, wherein a user navigates to a particular UI element hotspot via the help panel.

The implementation of UI hotspots may find particular value in connection with user experience level context information. That is, user access to a hotspot of a particular UI element may depend upon his or her level of experience.

For example, novice users may have access to hotspots corresponding to basic UI elements, to explain their role and function. By contrast, more experienced users may access hotspots corresponding to different UI elements.

Thus, an experienced user may be granted access to a hotspot for a UI element that is implicated in more complex workflows. By contrast, in order to avoid confusion associated with having too much information, a novice user not yet expected to create and/or manipulate complex workflows associated with that UI element, may be denied access to the hotspot.

The implementation of UI hotspots may also find particular value in connection with particular context data relevant to the user interaction. For example, context data may reveal that the user is interacting for the first time with a newly-released version of the software.

That version-specific context data may determine which UI elements are associated with hotspots, and also the nature of the help information presented in the hotspot. Thus a UI element corresponding to an entirely new feature being introduced by the latest version, may be provided with a hotspot having lengthy/detailed information accessible to users of all experience levels. But, a UI element merely updated by the new version may be provided with a hotspot having less detailed information (or even no hotspot at all).

While certain embodiments may rely upon context in the form of data of a particular room (i.e., data manipulation room) being accessed by the user, this is not required. According to different embodiments a wide variety of context data may be relied upon in order to collect help information relevant to a user's objectives in connection with the software program.

Examples of such context information can include but are not limited to:
number of times a particular user has logged into the current version of the software program;
number of times a user has logged into previous versions of the software program;
a number of times a particular user has entered a particular room of the software program;
current/previous actions taken by a user in this particular room or other rooms of the software program;
current/previous controls (buttons, panels, windows) the user has interacted with;
current/previous workflows the user has created and/or interacted with;
elapsed time since the user's last interaction with the software program (with a short-term delay indicating possible confusion/need for help in the current room, and a long-term delay indicating a possible lack of familiarity with the software program in general);
other questions recently suggested to users in the same room of the software program;
others;

Still other types of context information may be collected, stored, and referenced by the engine in the process of harvesting help information. For example, the engine may store an identifier of the form factor (e.g., desktop, cellphone, tablet) of specific device(s) with which the user is interacting with the software program. That context information could be referenced to determine help information that is returned to the user, and the manner of its presentation (e.g., font size, color, highlighting, language, amount of detail, etc.).

User preference information could also be referenced as context information in the process of collecting help information. For example, the user could store a preference that the help information be returned consistent with a particular device/form factor (e.g., desktop, cellphone, tablet). That preference could operate independently of a particular device/form factor detected based upon the user's current interaction with the software program. Thus, while a particular user is interacting with the software program over a desktop, he or she may specify through preferences that the relevant help information is to be delivered utilizing a different device/form factor.

Types of user preferences other than device/form factor may be referenced by the engine. Examples can include specific data sources of interest to the user, etc.

Yet other types of context information may be collected, stored, and referenced by the engine in the process of harvesting help information. For example, the engine may store an indication that a current UI action/room/page, is related to another UI action/room/page according to the generation and/or manipulation of a workflow.

Based upon this workflow-relevant context data, the engine could search a variety of sources for help information relating to different UI pages/rooms of other steps in the workflow. Linkage between particular UI pages/rooms according to a workflow may be specifically defined within the help system and/or the software program. Alternatively, the help engine itself could function to mine interactions between the user and the application to identify workflows themselves, and then provide relevant help information to the user based upon that workflow-related context data.

As an example of this, it may be noted that in the past multiple users may have become confused for the same reason, and accordingly engaged in a same or similar set of (unproductive) interactions with the application. Embodiments could recognize those interaction patterns as context information, and then rapidly provide useful help information effective to remove the confusion at an early stage.

In summary, embodiments of systems providing help for software applications may offer one or more benefits. For example, embodiments may contribute a familiar element to the UI that is visible/recognizable across many different screens or pages of a complex interface. This availability facilitates the user accessing help, especially when confronted with a new aspect of the user interface.

Embodiments may populate the help by offering top help questions with respect to the current context. These suggested question(s) can function to:
 invite the user to interact with the UI element;
 attempt to predict most likely problem user will encounter; and
 assist in framing the form of the search term to help grouping related queries.

One example of such a help question could be, e.g., "How to create a visualization with values from 2 datasets?" Seeing such a question present on the screen may prompt the user to seek out the help in resolving a problem.

Embodiments may serve to detect different levels of context. Such context can comprise a particular software application, UI room, dialog, workflow, etc. Upon experiencing a change of context, embodiments may update dynamically in order to offer the user more relevant information (e.g., suggested help question).

A user may interact with the help functionality simply by clicking into a search box. This input clears for the user to type a specific question ("How do I . . . "), with a predetermined number of top suggested searches being presented (e.g., in a drop-down box beneath).

The user can the user can click one of the suggested questions. Alternatively, the user can type in a freeform question into the textbox.

Search results relevant to the help subject may be returned from multiple sources—e.g., particular user groups, SCN, YOUTUBE (video), GOOGLE, and others. Combined results may be displayed in an overlay.

Help search results may be ranked dynamically, based upon user behavior. Examples of such behavior can include but are not limited to, clicks, user voting, and manual promotion.

If the user is asking a new question, freeform search may be utilized. The suggested searches can assist the user in framing the relevant question in a consistent format.

Suggestions may update as the user types into the search box, providing questions similar to what the user is typing. The user can click on an existing question that is offered.

New questions that are submitted are added to the list of questions for the current context. The questions can be ranked based upon factors such as frequency of the query, and/or by internal flagging.

As described above, help topics specifically relating to the role of particular UI elements, may be addressed utilizing the interactive hotspot feature. These hotspots provide targeted, contextual, interactive information allowing users to discover, learn, and keep up with changes in the user interface.

Hotspots highlight specific UI elements, drawing the user's attention to them. The hotspots are interactive, e.g., they can be clicked on to discover information about that UI element.

Relevant information is provided in context, at the location of the hotspot (such as in a floating widget). This allows the user to discover and learn about the UI as they interact with and experience the software.

UI element hotspots according to embodiments may offer one or more of the following properties.
 UI element hotspots may be presented upon first entry into a page/screen of an application.
 UI element hotspots can highlight new features in the UI after an upgrade (including an auto-upgrade) has occurred.
 UI element hotspots can be specifically associated with a particular user experience level (e.g., novice, intermediate, expert), permitting their content to be targeted for that user and experience level.
 Clicking on a UI element hotspot can provide text information responsive to fundamental aspects (e.g., who, what, why, and how) of that UI element.
 Clicking on a UI element hotspot can populate the help system search box with top search results relating to that UI feature (to provide more information on that context).
 UI element hotspots can be activated/deactivated by the user in order to show or hide information.

Figure 2:
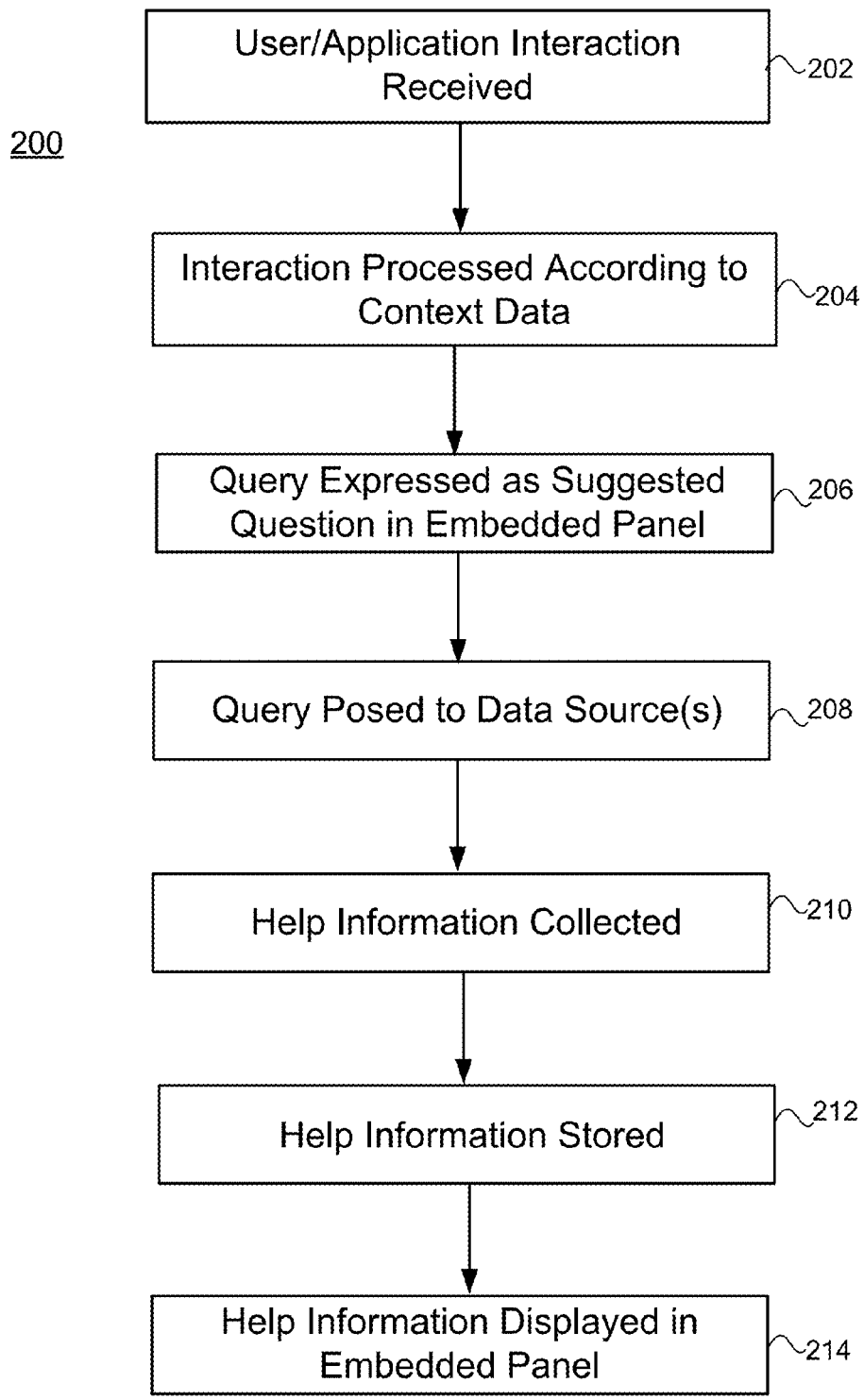
FIG. 2 shows a simplified flow diagram of a method according to an embodiment.

FIG. 2 is a simplified flow diagram showing a method 200 according to an embodiment. In a first step 202, an engine receives a first interaction between a user and a software application.

In a second step 204 the engine processes the first interaction according to the context data to formulate a query. In a third step 206 the engine expresses the query as a suggested question in panel embedded in an interface.

In a fourth step 208 the engine poses the query to a plurality of data sources in response to the user selecting the suggested question. In a fifth step 210 the engine collects help information from one of the plurality of data sources in response to the query.

In a sixth step 212 the engine stores the help information. In a seventh step 214 the engine displays the help information in the panel.

Figure 3:
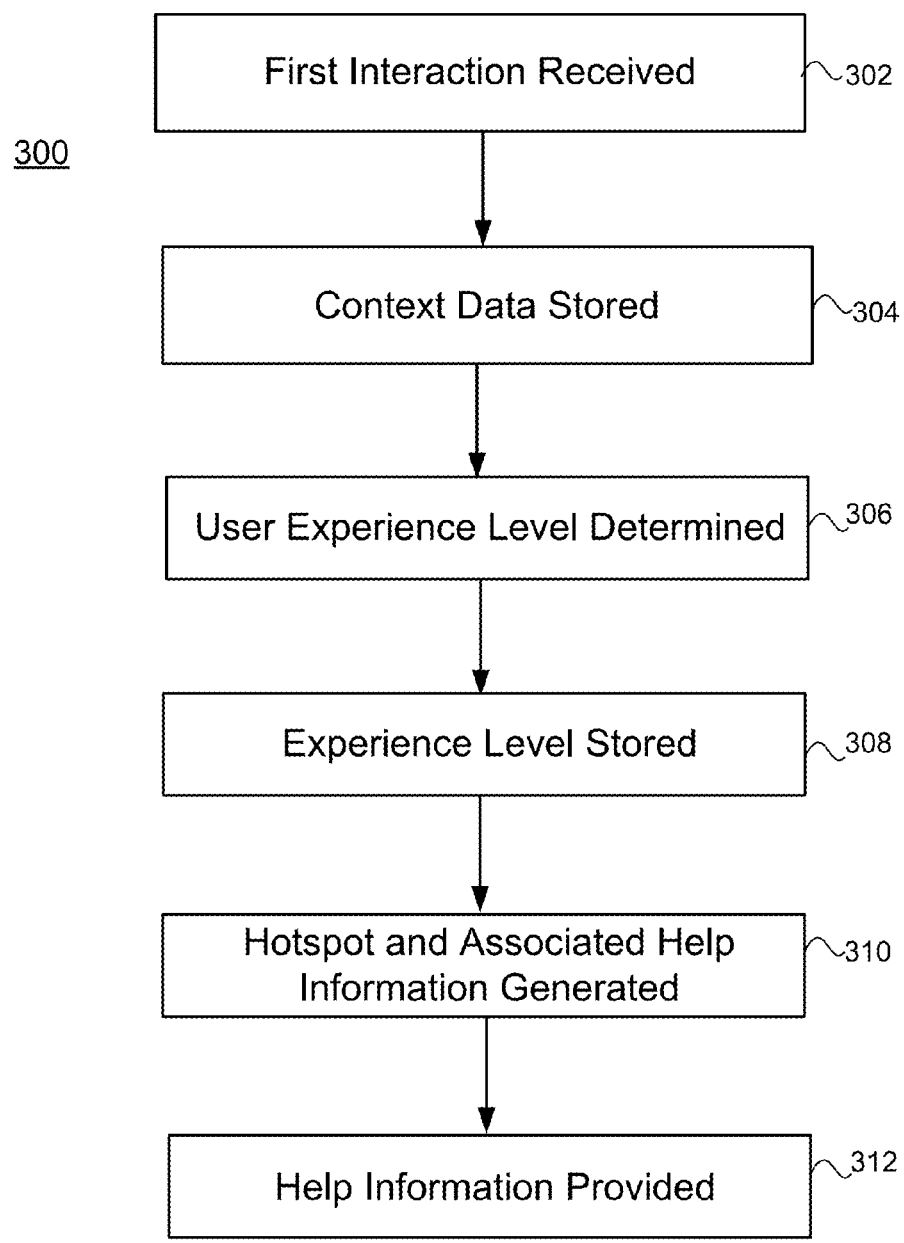
FIG. 3 shows a simplified flow diagram of a method according to an embodiment.

FIG. 3 is a simplified flow diagram showing a method 300 according to an embodiment. In a first step 302, an engine receives a first interaction between a user and a software application.

In a second step 304, the engine stores context data reflecting the first interaction. In a third step 306, the engine determines an experience level of the user based upon the context data.

In a fourth step 308 the engine stores the experience level with the context data. In a fifth step 310 the engine processes the context data to generate an interface including a hotspot of a user interface element of the software application and associated help information.

In a sixth step 312, in response to a second interaction between the user and the hotspot, the engine provides the help information based upon the experience level in a panel embedded in the interface.

EXAMPLE

One example is now provided in the context of providing help in the LUMIRA platform environment available from SAP SE of Walldorf, Germany. A user accesses the SAP LUMIRA platform in order to access stored data and to create visualizations of that stored data.

Figure 4:
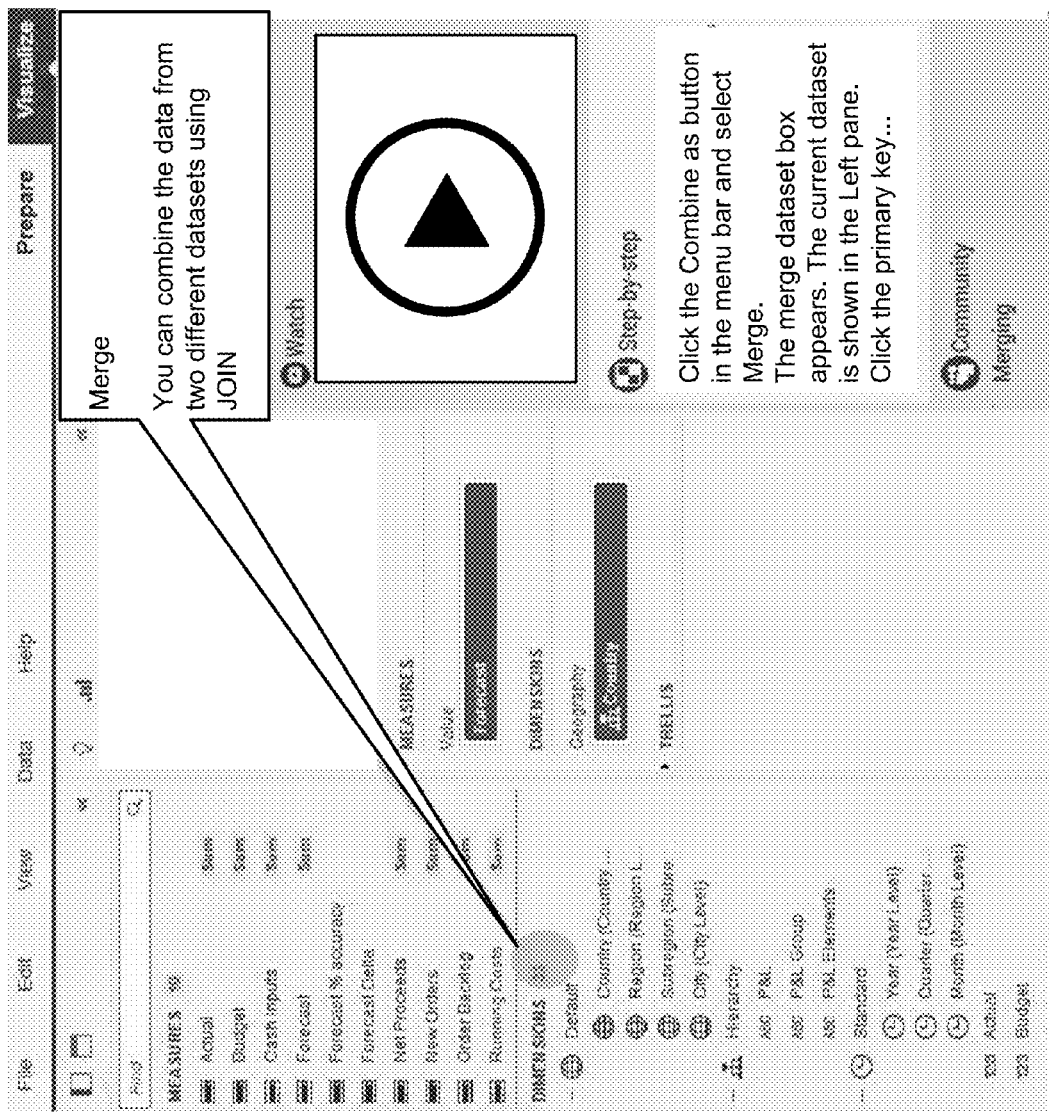
FIG. 4 shows a sample help pane embedded in a UI screen according to an example.

As shown in the screen shot of FIG. 4, this example shows presentation of help information in a hotspot pane embedded within a user interface screen showing a visualization room. The help information offered in this panel relates to the merging of data in connection with a forecast by country. Various windows within the pane offer help information from various sources, including a video, step by step instructions, and a community forum.

The help functionality may be based upon a hierarchical approach. That is, context data may be recognized and stored according to a hierarchy. One example of such a hierarchy could comprise: Application→Room→Page→Contact.

Returning to FIG. 1, while that figure shows the engine as separate from the database layer, this is not required. In certain embodiments, the engine may be implemented by a database engine, such as an in-memory database engine.

Figure 5:
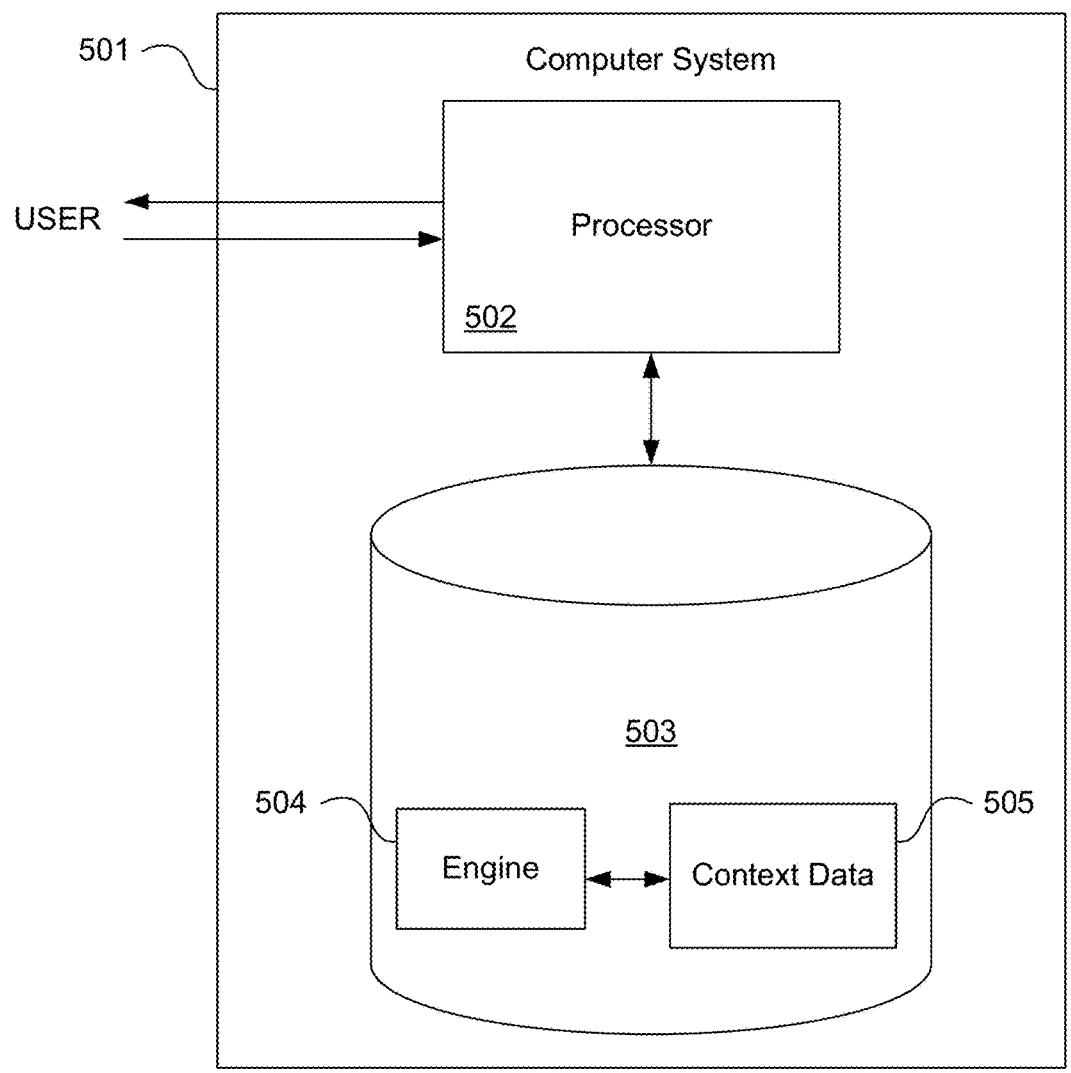
FIG. 5 illustrates hardware of a special purpose computing machine configured to provide an interactive UI element hotspot according to an embodiment.

For example, FIG. 5 illustrates hardware of a special purpose computing machine configured to provide software help information according to an embodiment. In particular, computer system 501 comprises a processor 502 that is in electronic communication with a non-transitory computer-readable storage medium 503. This computer-readable storage medium has stored thereon code 505 corresponding to context data. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the engine may be implemented in other ways, for example as part of an overlying application layer.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   an in-memory database engine receiving a first interaction between a first user device having a first form factor and a software application;
   the in-memory database engine storing in an in-memory database remote from the first user device, context data of the first interaction, the context data comprising a linkage between a page and a room of a workflow, with another page and another room of a different step of the workflow;
   the in-memory database engine processing the first interaction according to the context data to formulate a query;
   the in-memory database engine expressing the query as a suggested question in a panel embedded in an interface of a second user device remote from the first user device and from the in-memory database;
   the in-memory database engine posing the query to a plurality of data sources based on the linkage, in response to the user selecting the suggested question;

the in-memory database engine collecting help information from one of the plurality of data sources in response to the query;
the in-memory database engine storing the help information;
the in-memory database engine weighting the help information based upon data source provenance, wherein a first weight of an official help source is greater than a second weight of an unofficial help source which is greater than a third weight of a raw internet search result;
the in-memory database engine displaying the help information in the panel according to the weighting; and
the in-memory database engine causing the help information to be displayed on a different device having a second form factor different from the first form factor, the in-memory database engine referencing a registry storing the first form factor to cause the help information to be displayed on the different device, the registry further storing the context data indicating creation of a new workflow.

2. A method as in claim 1 further comprising:
the in-memory database engine collecting additional help information from another of
the plurality of data sources in response to the query;
the in-memory database engine storing the additional help information; and
the in-memory database engine displaying the additional help information in the panel.

3. A method as in claim 2 further comprising:
the engine weighting the additional help information; and
the engine displaying the additional help information ranked according to the weighting.

4. A method as in claim 1 wherein the first user interaction comprises a step in a workflow and the context information identifies the workflow.

5. A method as in claim 4 wherein the workflow is defined by the software application.

6. A method as in claim 1 wherein the engine generates a keyword of the query based upon the context data.

7. A non-transitory computer readable storage medium embodying a computer program for performing a method, said method comprising:
an in-memory database engine receiving a first interaction between a first user device having a first form factor and a software application;
the in-memory database engine storing in an in-memory database remote from the first user device, context data of the first interaction, the context data comprising a linkage between a page and a room of a workflow, with another page and another room of a different step of the workflow;
the in-memory database engine processing the first interaction according to the context data to formulate a query;
the in-memory database engine expressing the query as a suggested question in panel embedded in an interface of a second user device remote from the first user device and from the in-memory database;
the in-memory database engine posing the query to a plurality of data sources based on the linkage, in response to the user selecting the suggested question;
the in-memory database engine collecting help information from one of the plurality of data sources in response to the query;
the in-memory database engine storing the help information and the additional help information;
the in-memory database engine weighting the help information based upon data source provenance, wherein a first weight of an official help source is greater than a second weight of an unofficial help source which is greater than a third weight of a raw internet search result;
the in-memory database engine displaying the help information and the additional help information in the panel according to the weighting; and
the in-memory database engine causing the help information to be displayed on a different device having a second form factor different from the first form factor, the in-memory database engine referencing a registry storing the first form factor to cause the help information to be displayed on the different device, the registry further storing the context data indicating creation of a new workflow.

8. A non-transitory computer readable storage medium as in claim 7 further comprising:
the in-memory database engine weighting the help information and the additional help information; and
the in-memory database engine displaying the additional help information ranked according to the weighting.

9. A non-transitory computer readable storage medium as in claim 7 wherein:
the first user interaction comprises a step in a workflow and the context information identifies the workflow; and
the workflow is defined by the software application.

10. A computer system comprising:
one or more processors;
a software program, executable on said computer system, the software program configured to cause an in-memory database engine to:
receive a first interaction between a first user device having a first form factor and a software application;
store in an in-memory database remote from the first user device, context data of the first interaction, the context data comprising a linkage between a page and a room of a workflow, with another page and another room of a different step of the workflow;
process the first interaction according to context data from the in-memory database to formulate a query;
express the query as a suggested question in panel embedded in an interface of a second user device remote from the first user device and from the in-memory database;
pose the query to a plurality of data sources based on the linkage, in response to the user selecting the suggested question;
collect help information from one of the plurality of data sources in response to the query;
store the help information in the in-memory database;
assign a weight to the help information based upon a provenance of the one of the plurality of data sources, wherein a first weight of an official help source is greater than a second weight of an unofficial help source which is greater than a third weight of a raw internet search result;
display the help information in the panel according to the weight; and
cause the help information to be displayed on a different device having a second form factor different from the first form factor, by referencing a registry storing the first form factor to cause the help information to be displayed on the different device, the registry further storing the context data indicating creation of a new workflow.

11. A computer system as in claim 10 wherein:
the first user interaction comprises a step in a workflow and the context information identifies the workflow; and
the workflow is defined by the software application.

12. A computer system as in claim 10 wherein the software program is further configured to cause the in-memory database engine to:
collect additional help information from another of the plurality of data sources in response to the query;
store the additional help information in the in-memory database; and
display the additional help information in the panel.

* * * * *